Jan. 10, 1950

C. S. BATCHELOR ET AL 2,494,281

APPARATUS FOR BONDING BRAKE LININGS TO BRAKE SHOES

Filed May 13, 1948

Inventors:
Clyde S. Batchelor
E. L. Carey
By: Lee J. Gary
Attorney

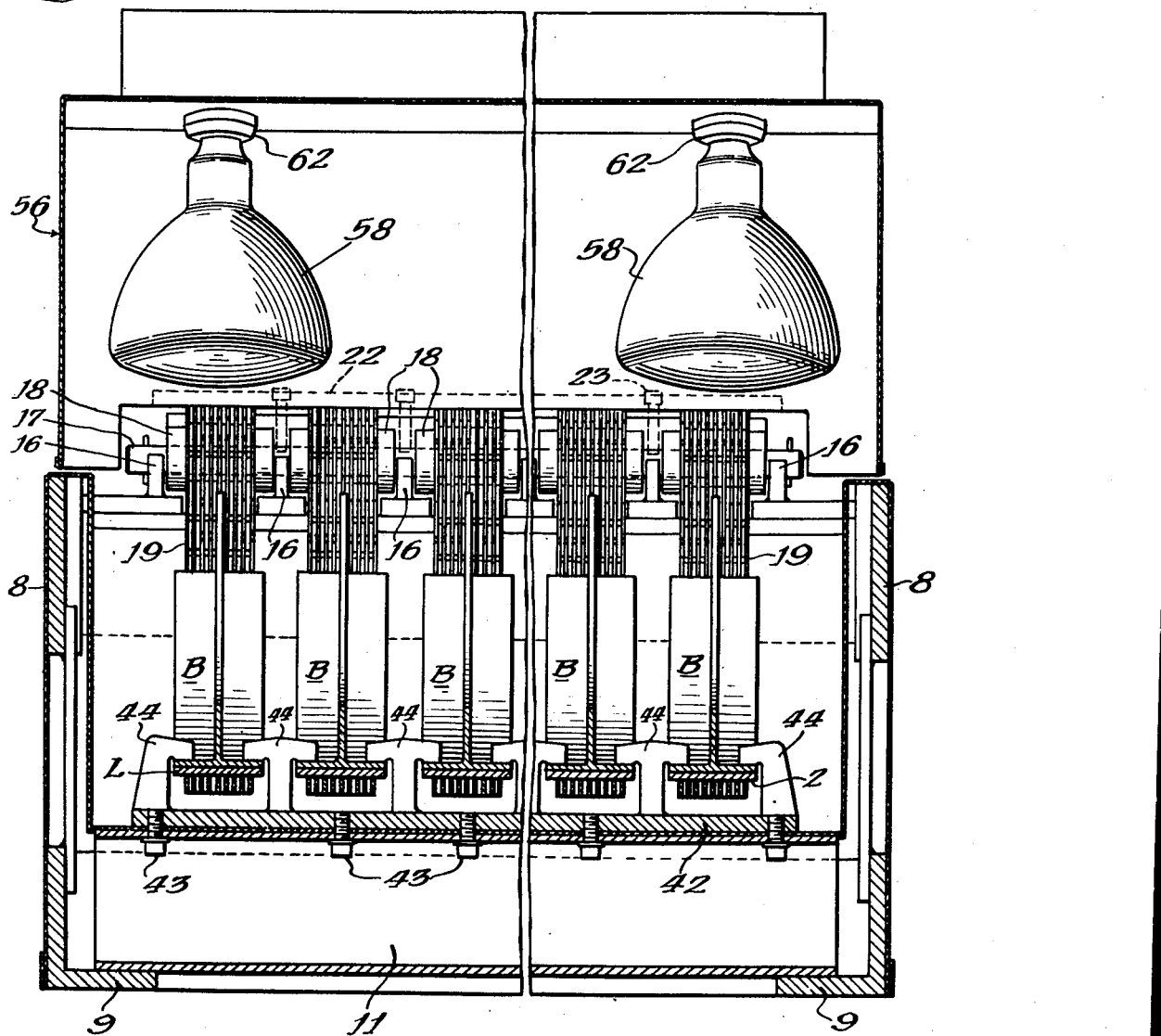

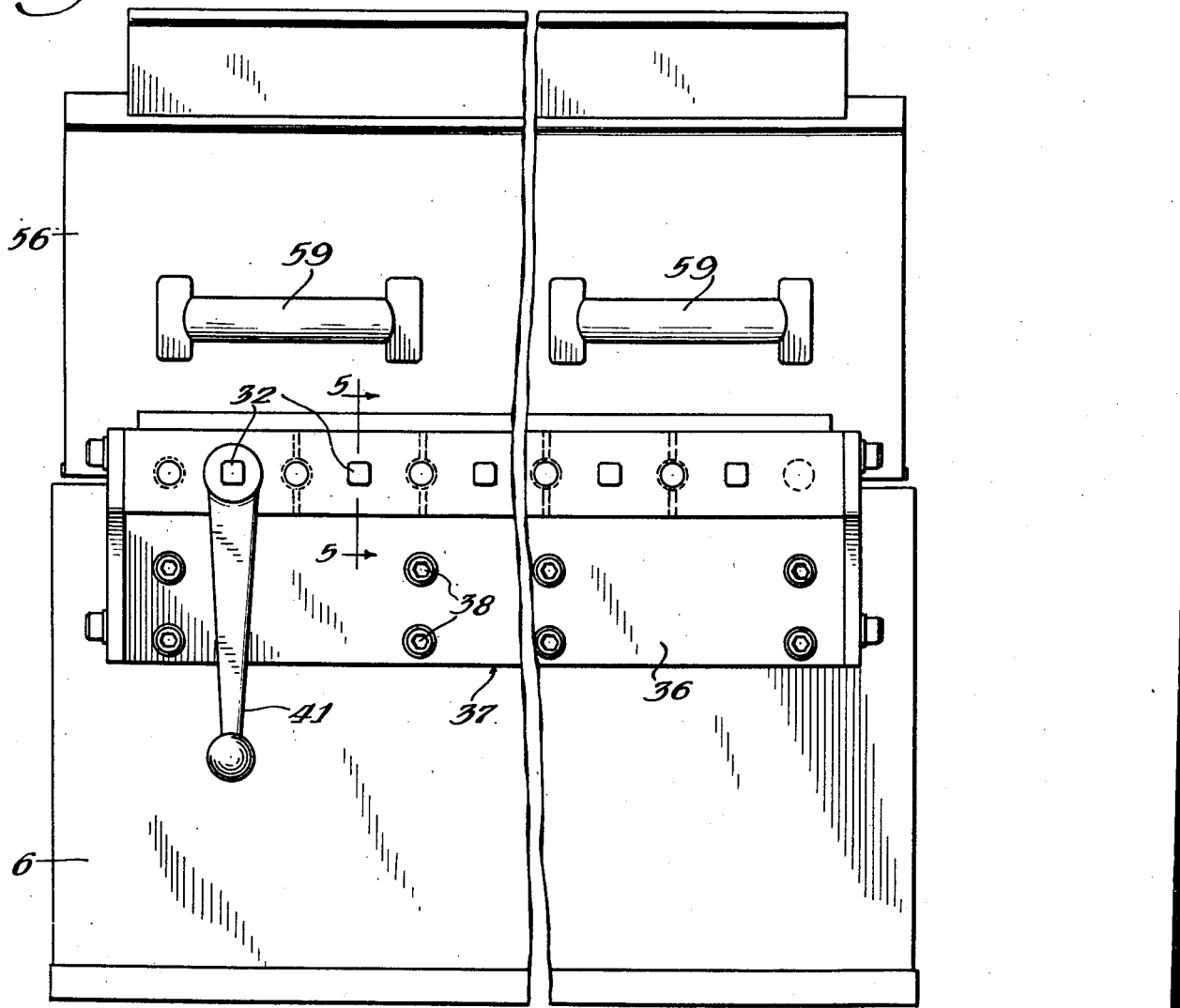
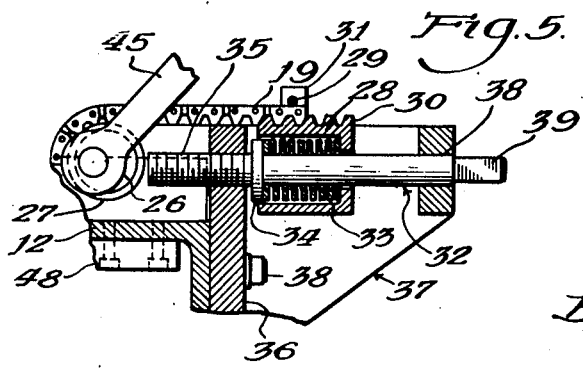

Patented Jan. 10, 1950

2,494,281

UNITED STATES PATENT OFFICE 2,494,281

APPARATUS FOR BONDING BRAKE LININGS TO BRAKE SHOES

Clyde S. Batchelor, Upper Stepney, and Edward L. Carey, Bridgeport, Conn., assignors to Raybestos-Manhattan, Inc., Passaic, N. J., a corporation of New Jersey Application May 13, 1948, Serial No. 26,810

7 Claims. (Cl. 154—1)

This invention relates to improvements in bonding devices and is more particularly concerned with the provision of a bonding device adapted for use in adhesively uniting brake linings to brake shoes.

The present invention contemplates the provision of a bonding device adapted for use in automobile service stations, said device preferably embodying eight independently operable units for applying brake linings to eight brake shoes, and has for an object the provision of a bonding device in which the several units may readily be adjusted to accommodate brake shoes of different sizes and different radii and angle of curvature.

This invention further contemplates the provision of a bonding device in which each of the several units embodies means to insure uniform engagement between the mating surfaces of the brake lining and brake shoes.

It is a further object of this invention to provide a bonding device embodying infra-red lamps for heating and curing the bonding material employed in adhesively uniting the brake lining to brake shoes. The adhesives preferably employed in the device for bonding brake lining to brake shoes are of the heat-hardening type, such as thermosetting phenolic resins or modified phenolic resins, such as resin-rubber combinations, the adhesive being applied to the mating surfaces of the lining and brake shoes. By mounting infra-red lamps in position to direct infra-red rays against the highly heat-conductive metallic brake shoes, the absorption of the heat from the rays is rapid and the bonding area containing the adhesive is heated quickly.

This invention further contemplates the provision of a bonding device which is relatively simple and inexpensive in construction and which will not readily get out of order.

This invention embodies other novel features, details of construction and arrangement of parts which are hereinafter set forth in the specification and claims, and illustrated in the accompanying drawings wherein:

Fig. 3 is a transverse sectional view taken along the line 3—3 of Fig. 2.

Fig. 4 is an end elevational view showing the bonding device.

Fig. 5 is a detail sectional view taken along the line 5—5 of Fig. 4.

Figure 1:
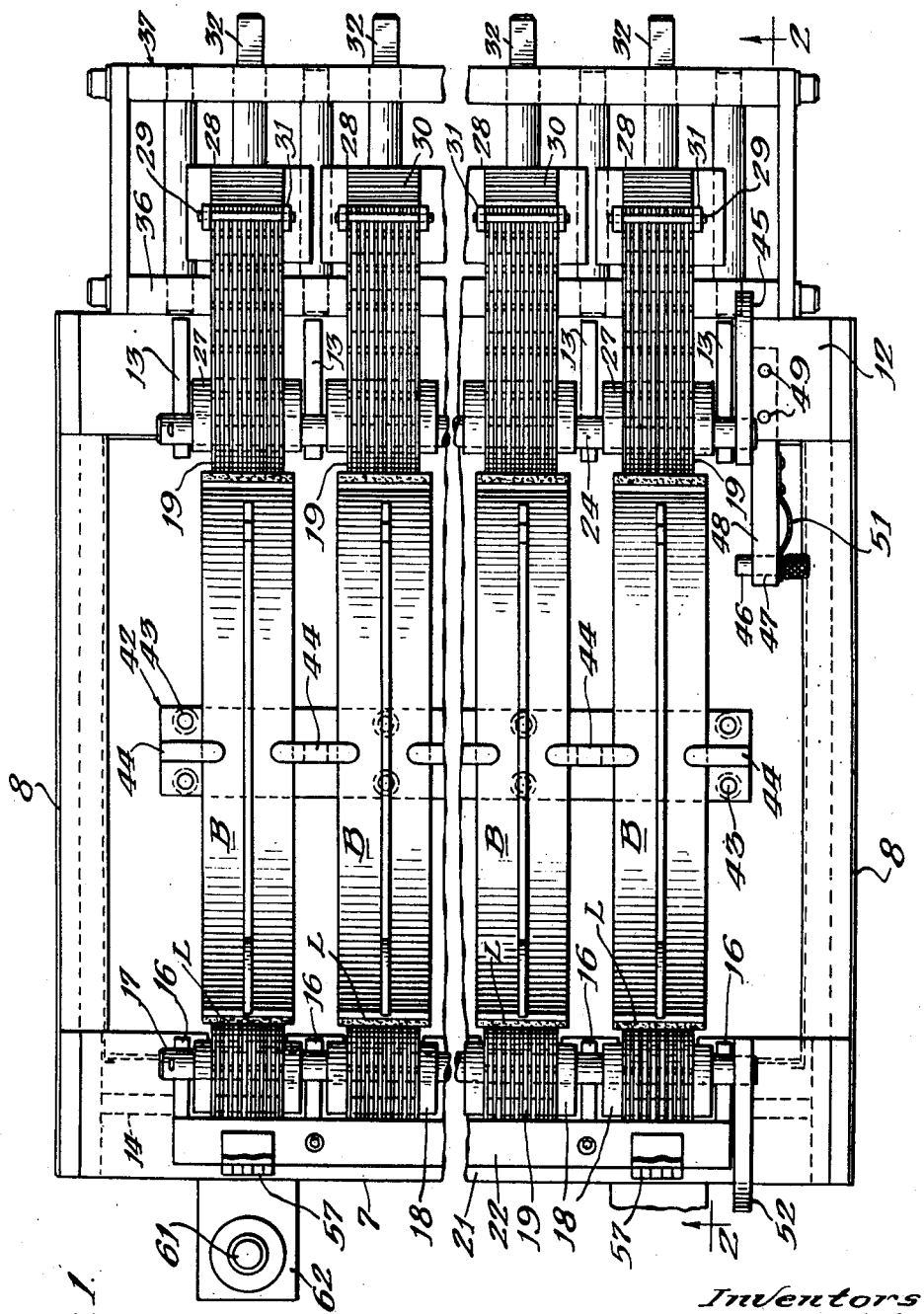
Fig. 1 is a top plan view illustrating a bonding device embodying features of the present invention, the cover of the device being removed to more clearly illustrate the construction.

Referring now to the drawings for a better understanding of this invention, the bonding device is shown as comprising a front wall 6, rear wall 7 and side walls 8—8 which are secured together to form a relatively strong integral structure. The lower ends of the side walls 8—8 are provided with inturned flange portions 9—9 to receive and support a transversely disposed I-beam 11, the ends of the I-beam being bolted, welded or otherwise secured to the supporting flanges 9—9. The upper end of the front wall 6 is provided with an inturned flange 12 upon which a plurality of bearing plates 13 are welded, bolted or otherwise secured. The upper rear corners of the side walls 8—8 are bolted, welded or otherwise secured to the ends of a transversely disposed T-beam 14.

The bonding device is shown and described as preferably embodying a plurality of bonding units which are similar in construction and operation for applying brake lining to one or more brake shoes. To avoid repetition, the following description of the construction and operation of one unit shall also apply to the other units wherein corresponding numbers have been applied to corresponding parts.

A plurality of bearing plates 16 are welded, bolted or otherwise secured to the upper surface of the T-beam 14 to support a rear adjustment shaft 17 for rotational movement. Each bonding unit comprises a rear eccentric adjustment member 18 keyed to the shaft 17 for engagement against the underside of a chain 19 which is preferably of the Morse silent-chain construction. The rear end of the chain 19 is secured to a block 21 by means of a locking plate 22 and cap screws 23, the block being welded, bolted or otherwise secured to the upper surface of the T-beam 14.

A front adjustment shaft 24 is journaled for rotational movement in the bearing plates 13 and has an eccentric 26 keyed thereto, the eccentric being provided with an anti-friction sleeve bearing 27 for engagement against the underside of the chain 19. A spring housing 28 is provided at the front side of the device to engage the forward end of the chain 19, the chain being secured to the housing by means of a crosspin 29 demountably positioned in apertures provided in a pair of spaced bosses 31 formed on the housing. The upper surface of the spring housing 28 is formed with teeth 30 for meshing engagement with the teeth formed in the chain 19. It will thus be noted that the end of the chain 19 may be adjusted relative to the housing 28 by merely removing the crosspin 29.

Each spring housing 28 is bored to receive a chain-tensioning screw 32 and a compression spring 33, one end of the compression spring being engaged against an inner wall formed on the housing and its other end engaged against an abutment shoulder 34 formed on the screw 32. The inner end of the tensioning screw 32 is threaded at 35 for engagement in a threaded aperture provided in the forward wall 36 of a mounting bracket 37 which is secured to the front wall 6 by means of cap screws 38. The outer end of the tensioning screw 32 projects through a bearing aperture 38 formed in the mounting bracket 37 and is formed non-circular in cross-section at 39 to receive the socket portion 40 of a wrench 41.

Figure 2:
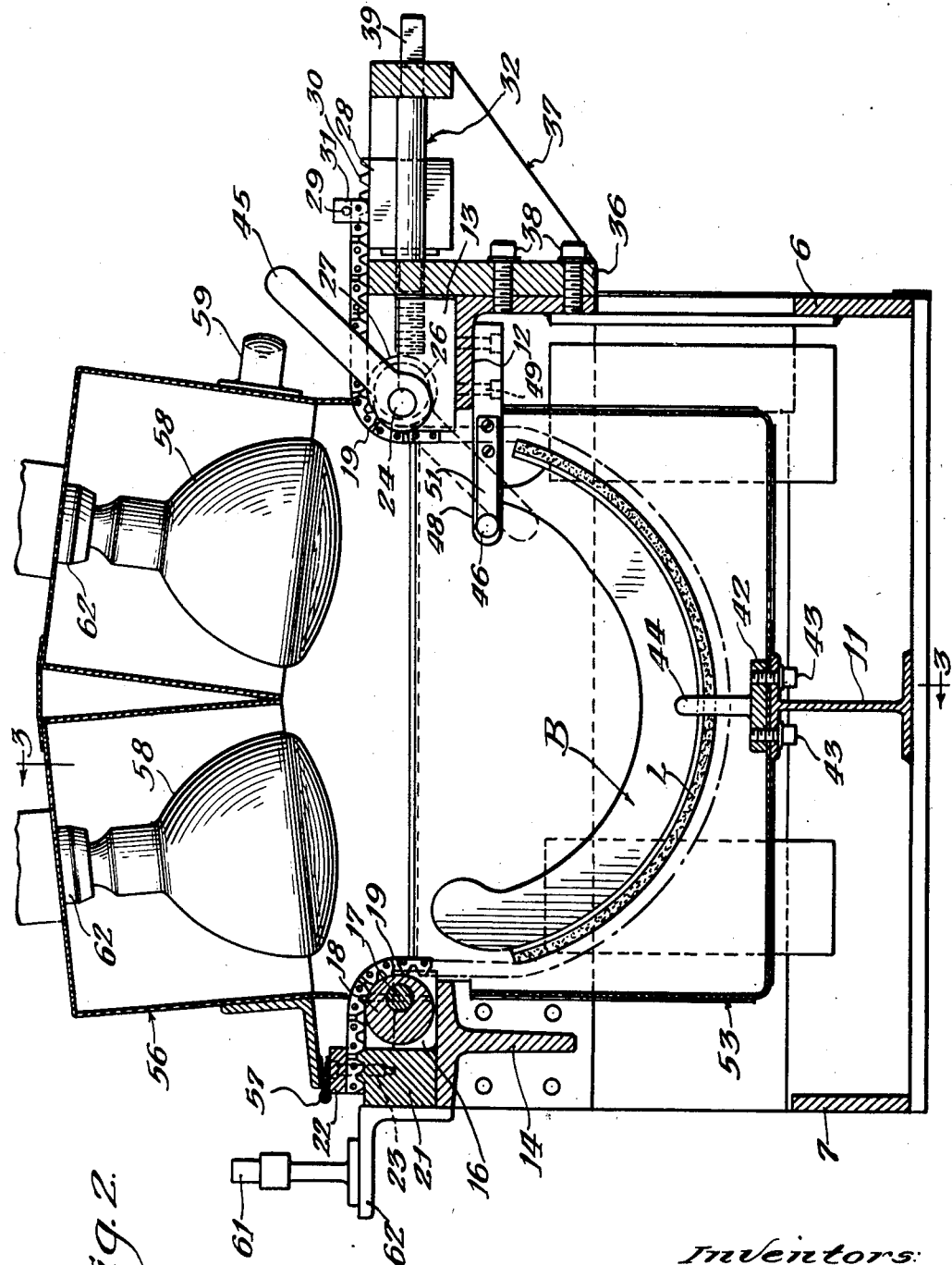
Fig. 2 is a longitudinal sectional view taken along the line 2—2 of Fig. 1.

A retaining plate 42 is secured to the upper flange of the I-beam 11 by means of bolts or cap screws 43, and is formed with retaining lugs 44 to engage against the inner surface of a brake shoe B positioned upon the chain 19. As illustrated most clearly in Fig. 2, the chain 19 has its rear end secured to the block 21 and extends inwardly and downwardly over the rear eccentric 18 under the brake shoe B, and thence upwardly over the front eccentric 26 for engagement with the spring housing 28.

A lever 45 is provided on the front adjustment shaft 24 and may, if desired, be held against upward movement by means of a pin 46 mounted for axial movement in an aperture 47 formed at the outer end of an arm 48 which is secured to the inturned flange 12 by means of cap screws 49. The locking pin 46 is normally held in its inner position, illustrated in Fig. 1, by means of a flat spring 51 which has its one end secured to the arm 48 and its other end secured to the pin 46. An adjustment lever 52 is secured to one end of the rear adjustment shaft 17 to adjust the position of the rear eccentric 18. A trough-shaped metal liner 53 is provided to receive the brake shoe B, brake lining L and the intermediate portion of the chain 19. The liner 53 is preferably supported upon the I-beam 11 and secured against displacement by cap screws 43.

A cover 56 is hingedly connected at 57 to the clamping plate 22, and is adapted to receive and support a plurality of infra-red lamps 58 which are disposed to direct infra-red rays downwardly against the inner surface of the metal brake shoe B to heat and cure the bonding adhesive applied to mating surfaces of the brake shoe B and lining L. The cover is provided with a suitable handle 59 to be manually engaged in swinging the cover forwardly into closed position or rearwardly into open position in engagement with stop members 61 mounted on an angle iron 62 secured to the block 21. The infra-red lamps 58 are mounted in suitable sockets 62 which are secured to the cover 56 and connected to a source of current by means of electrical conduits (not shown).

The bonding device shown and described is particularly adapted for use in automobile repair shops for applying new sets of lining to brake shoes of automobiles. As most automobiles are provided with eight brake shoes, the bonding device is preferably constructed with eight units whereby eight brake shoes may be relined simultaneously. As illustrated in the drawings, each brake shoe and its respective lining is engaged by a flexible chain 19 to hold the friction lining in tight uniform engagement with its respective brake shoe while the bonding adhesive is being heated and cured by means of infra-red rays directed against the inner surface of the brake shoes by the infra-red lamps 58. As each chain 19 and its cooperating parts are similar in construction and operation, the description of the operation of one chain and its cooperating parts also applies to the remaining chains and their cooperating parts.

In the operation of the bonding device, the mating surfaces of a brake shoe B and friction lining L are coated with a suitable adhesive of the heat-hardening type, such as thermosetting phenolic resins, or modified phenolic resins, such as resin-rubber combinations. The brake shoe B and its lining L are then positioned within the bonding device in the manner illustrated in Figs. 2 and 3 in the drawings. The brake shoe B and lining L are supported upon the flexible chain 19 which has its one end secured to the block 21 and its other end secured to the spring housing 28. The eccentrics 18 and 26 are then moved to adjusted position by means of their respective operating levers 45 and 52 to dispose the chain 19 at the optimum angle of contact with the lining L. The theoretical optimum position for the portions of the chain extending from the ends of the brake lining to the adjacent eccentrics would be substantially along a line tangent to the curvature of the lining. It is apparent that if the sling opening defined by the central portion of the chain 19 is too wide for the brake shoe and the lining that the point of tangency will be downwardly from the ends of the lining and that no pressure will be exerted to hold the ends of the lining in engagement against the ends of the brake shoe. In the event the brake shoe is too large for the sling opening, it will be apparent that heavy pressure will be exerted on the ends of the lining and that the pressure against the center of the lining will be minimized. By adjusting the positions of the eccentrics 18 and 26, it will be apparent that the sling opening defined by the chain 19 may be varied to suit a pre-determined range of sizes of brake shoes.

The chain 19 is placed under tension, to move the inner surface of the brake shoe B into abutting engagement against the stop lugs 44, by means of the chain-tensioning screw 32. Rotational movement of the screw 32 acts against the compression spring 33 to move the spring housing 28 away from the forward plate 36 of the brake 37 to draw the chain 19 into tight engagement against the outer surface of the lining L. The compression spring 33 serves to permit movement of the spring housing 28 along the screw 32 responsive to expansion or contraction of the chain 19 during the bonding operation. After a brake shoe and lining have been secured in position within the bonding device, the cover 56 is moved to its closed position and the infra-red lamps 58 are connected to a source of current. The infra-red rays are directed downwardly against the inner surface of the metal brake shoe B which rapidly absorbs and transfers the heat to the mating surfaces of the brake shoe and lining to heat and cure the adhesive.

While this invention has been shown in but one form, it is obvious to those skilled in the art that it is not so limited but is susceptible of various changes and modifications without departing from the spirit and scope of the claimed invention.

We claim as our invention:

1. In a bonding device for adhesively uniting a friction lining to the rim of a brake shoe, hook shaped members to engage the inner face and medial portion of a brake shoe rim to permit pivotal movement of the brake shoe, and a flexible element to hold a friction lining in tight engagement against the outer face of the brake shoe rim.

2. In a bonding device for adhesively uniting a friction lining to the rim of a brake shoe, hook shaped members to engage the inner face and medial portion of a brake shoe rim to permit pivotal movement of the brake shoe, a flexible element to hold a friction lining in tight engagement against the outer face of the brake shoe rim, and means to impart relative movement between said hook shaped members and said flexible element.

3. In a bonding device for adhesively uniting a friction lining to the rim of a brake shoe, hook shaped members to engage the inner face and medial portion of a brake shoe rim to permit pivotal movement of the brake shoe, a flexible element having its intermediate portion suspended downwardly in the form of a sling to receive and support the brake shoe and lining, and tension applying means connected to one end of said flexible element to move the brake shoe into engagement against said hook shaped members and to press the lining into tight engagement against the outer face of the brake shoe rim.

4. In a bonding device for adhesively uniting a friction lining to the rim of a brake shoe, hook shaped members to engage the inner face and medial portion of a brake shoe rim to permit pivotal movement of the brake shoe, a flexible element to hold a friction lining in tight engagement against the outer face of the brake shoe rim, and means to support said flexible element to provide optimum angle of contact with said lining.

5. In a bonding device for adhesively uniting a friction lining to the rim of a brake shoe, hook shaped members to engage the inner face and medial portion of a brake shoe rim to permit pivotal movement of the brake shoe, a flexible element to hold a friction lining in tight engagement against the outer face of the brake shoe rim, and adjustable means to support said flexible element to provide optimum angle of contact with said lining.

6. In a device for bonding a friction lining to the rim of a brake shoe, a casing, hook shaped members disposed within said casing to engage the inner face and medial portion of a brake shoe rim, a spring housing supported for movement relative to said casing, a flexible element to press a friction lining into tight engagement against the outer face of a brake shoe rim when the latter is engaged by said hook shaped members, one end of said flexible element being secured in fixed position on said casing and the other end of said element being secured to said spring housing, and means to move said spring housing to draw said flexible element into tight engagement against the lining of a brake shoe when the latter is engaged by said hook shaped members.

7. In a device for bonding a friction lining to the rim of a brake shoe, a casing, hook shaped members disposed within said casing to engage the inner face and medial portion of a brake shoe rim, a spring housing supported for movement relative to said casing, a flexible element to press a friction lining into tight engagement against the outer face of a brake shoe rim when the latter is engaged by said hook shaped members, one end of said flexible element being secured in fixed position on said casing and the other end of said element being secured to said spring housing, means to move said spring housing to draw said flexible element into tight engagement against the lining of a brake shoe when the latter is engaged by said hook shaped members, and means adjustably positioned on opposite sides of said casing to engage and adjust the intermediate sling-like portion of said flexible element to provide optimum angle of contact with the lining of a brake shoe when the latter is engaged by said hook shaped members.

CLYDE S. BATCHELOR.
EDWARD L. CAREY.

REFERENCES CITED

The following references are of record in the file of this patent:

UNITED STATES PATENTS

| Number | Name | Date |
|---|---|---|
| 1,547,716 | Bancroft | July 28, 1925 |
| 1,706,635 | Smith | Mar. 26, 1929 |
| 1,903,058 | McNaught | Mar. 28, 1933 |
| 2,067,086 | Hoffman | Jan. 5, 1937 |
| 2,139,876 | Bullington | Dec. 13, 1938 |
| 2,275,430 | Hart | Mar. 10, 1942 |
| 2,358,483 | Tilden | Sept. 19, 1944 |
| 2,392,079 | Andreef | Jan. 1, 1946 |
| 2,402,631 | Hull | June 25, 1946 |
| 2,444,191 | Friberg | June 29, 1948 |